United States Patent [19]

Calvert et al.

[11] 4,318,465

[45] Mar. 9, 1982

[54] INDEXING DRIVE CONTROL

[75] Inventors: James W. Calvert, Cincinnati; Charles P. Shinkle, Bethel, both of Ohio

[73] Assignee: Cincinnati Milacron Inc., Cincinnati, Ohio

[21] Appl. No.: 153,898

[22] Filed: May 28, 1980

[51] Int. Cl.³ .............................................. B65G 43/00
[52] U.S. Cl. .................................... 198/341; 198/480; 198/856; 198/859
[58] Field of Search ............... 198/340, 341, 345, 466, 198/480, 803, 859, 856, 472

[56] References Cited

U.S. PATENT DOCUMENTS

| 1,223,571 | 4/1917 | Doolittle | 29/38 C |
| 2,884,113 | 4/1959 | Converse et al. | 198/340 |
| 2,986,949 | 6/1961 | Lancaster | 74/84 |
| 2,999,311 | 9/1961 | McDonald | 29/401 |
| 3,355,763 | 12/1967 | Willert | 425/32 |
| 4,270,649 | 6/1981 | Mayer | 198/341 |

FOREIGN PATENT DOCUMENTS 2754095  7/1978  Fed. Rep. of Germany ...... 198/472

Primary Examiner—Joseph E. Valenza
Attorney, Agent, or Firm—John W. Gregg

[57] ABSTRACT

An apparatus and method are disclosed for transporting products to and from the machine function operating stations of an integrated machine. The apparatus provides a table for carrying the products which is rotatably indexed by a drive system as required by the overall machine cycle of operation. The indexing drive system comprises an indexer, a driving motor, a brake, means for monitoring the orientation of the table and indexer input and circuitry operative to control the motor and brake to execute the cycle of operation of the indexer while simultaneously initiating activity of the machine operating station mechanisms in accordance with the disclosed method.

11 Claims, 7 Drawing Figures

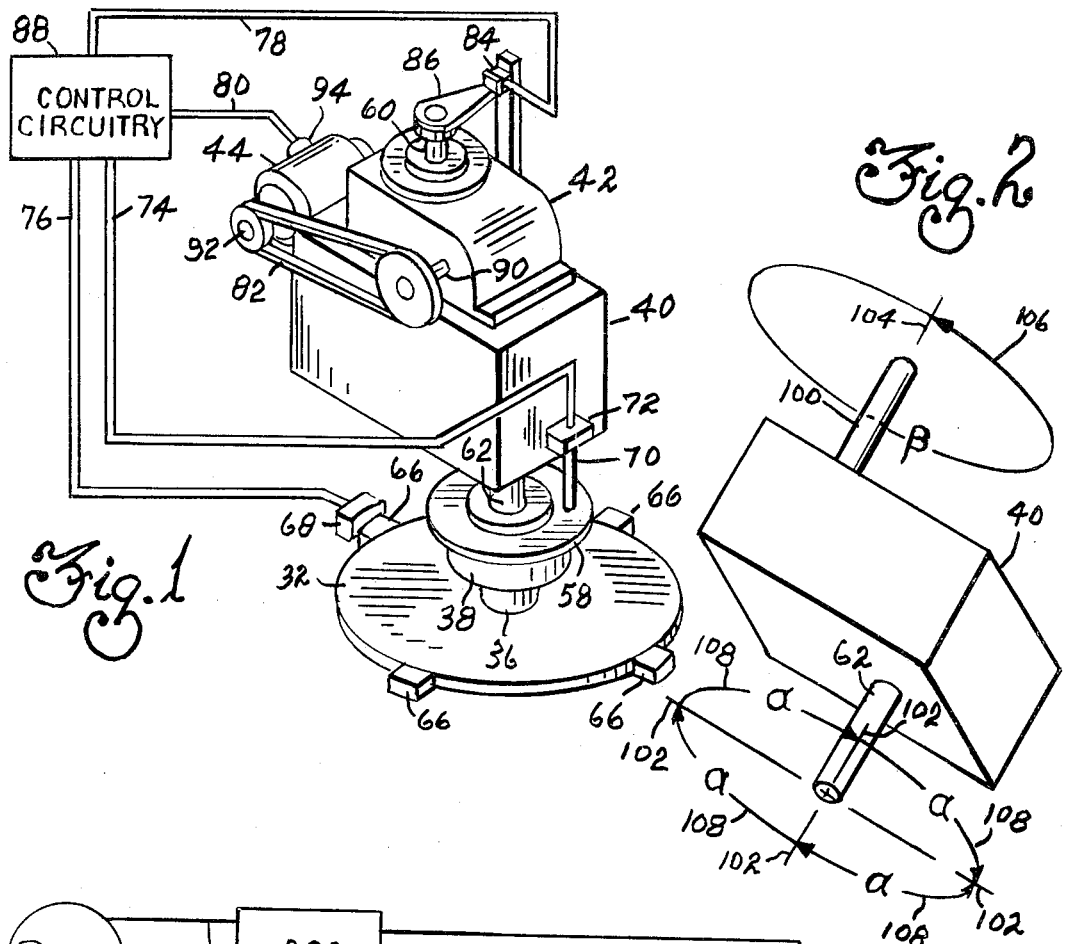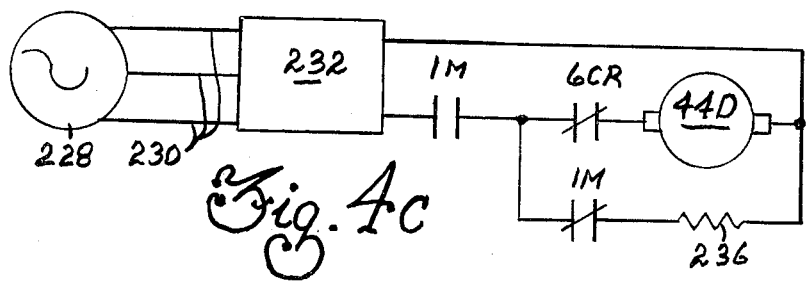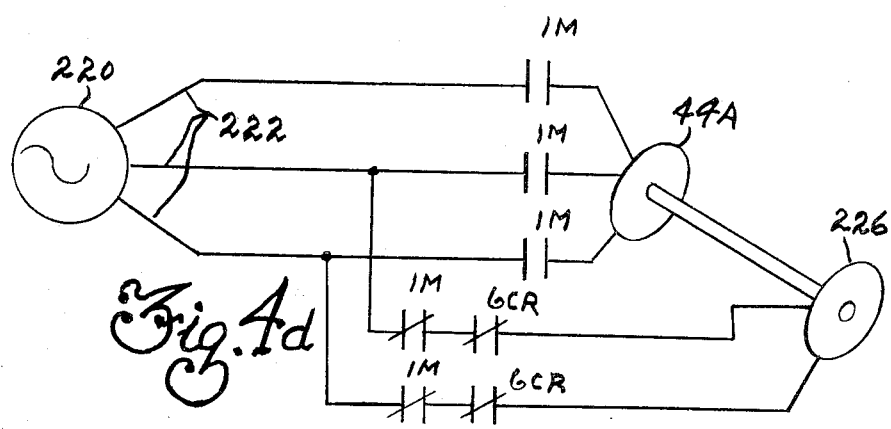

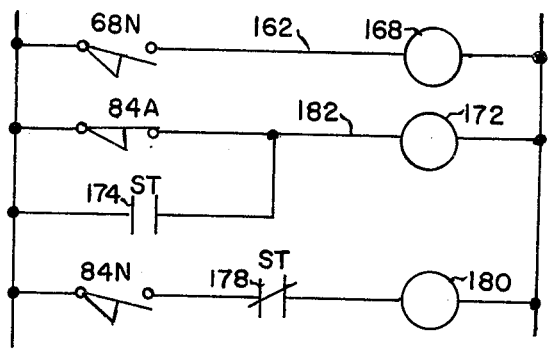
Fig.4a
Fig.4b
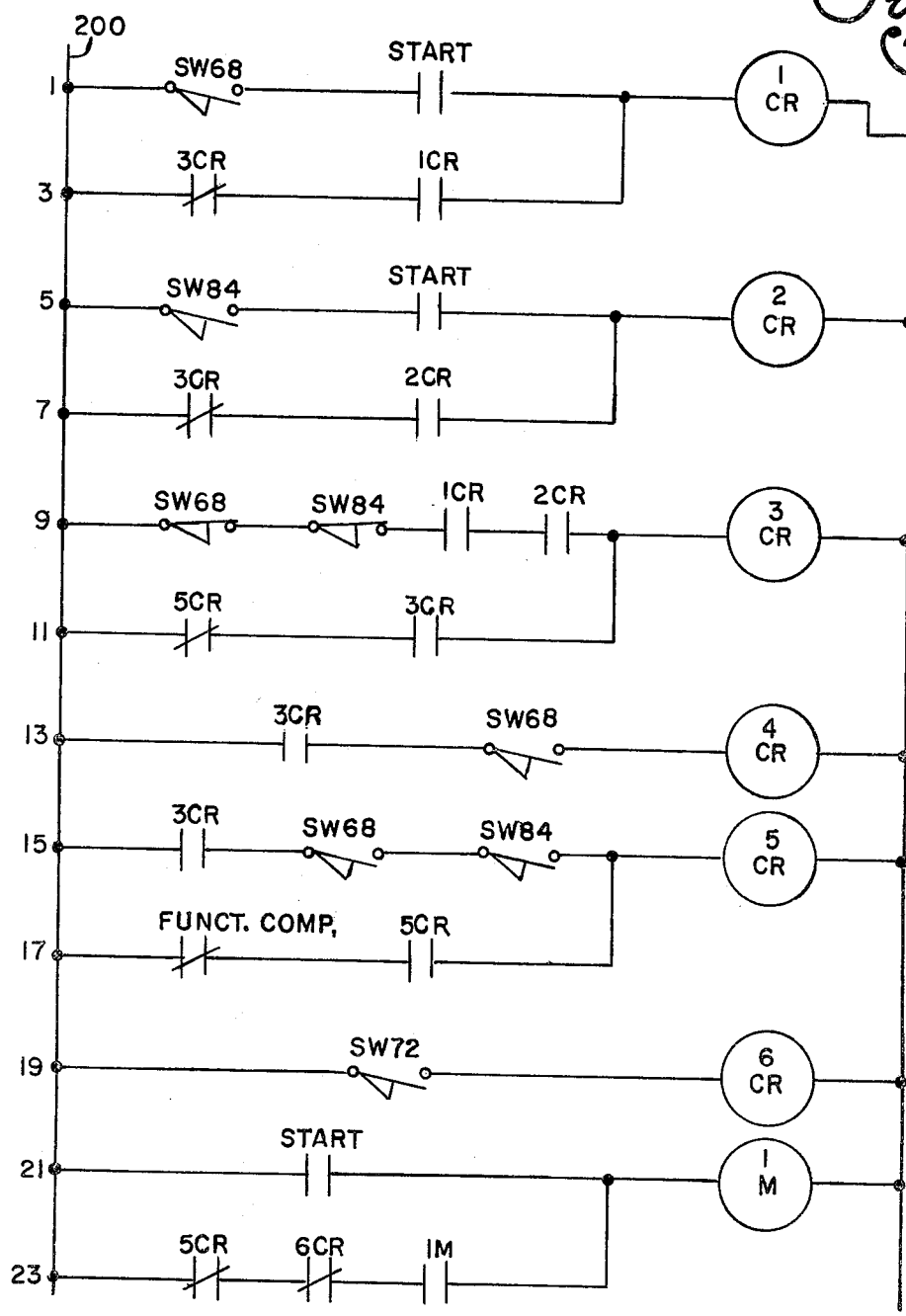

INDEXING DRIVE CONTROL

BACKGROUND OF THE INVENTION

The invention relates generally to product conveyance in multiple function integrated machinery. One specific aspect relates to an apparatus and method for transporting products in an indexing rotary manner to and from the operating stations of an integrated machine. Without intending to be a limitation thereof, the invention is described as used and implemented in an integrated machine with four operation stations.

In machines of this type, the need to accurately align the products with the mechanism at each machine operating station, imposes a severe requirement on the accuracy and repeatability of the indexing drive system. Further, to successfully execute the machine functions at the operating stations, the product carrier must be held in place against forces exerted on the products by the station mechanisms. In the past, these requirements have been met by indexing devices which relied on positive stops. Examples include paddle torque motors and shot pin locks. Such devices have the adverse characteristic of degraded performance over time due to mechanical wear. Furthermore, if a drive were designed relying only on a torque motor to hold the product carrier in place, the overall machine cycle time would be increased by the time needed to reset the torque motor to a start position in preparation for the next index.

An index drive is disclosed incorporating an indexing mechanism which achieves the desired accuracy, repeatability and self-locking qualities without resort to positive stops. The operation of this mechanism is further enhanced by the disclosed method of controlling the indexer driving motor so as to avoid degradation of the overall machine cycle time.

SUMMARY OF THE INVENTION

According to one embodiment of the invention, a method and apparatus are provided for rotatably transporting products to and from operating stations of an integrated machine. The products are carried by a disklike table which is rotated through a segment of a full revolution when the machine cycle of operation requires that the products of each operating station be transported to the next station. An indexer used to achieve the required intermittent rotation is coupled to the table by a clutch which disengages to relieve the indexer output from excessive torque as could be generated by mechanical interference preventing rotation of the table. The indexer input is driven by a direct current motor and regenerative brake combination through a speed reducer. The motor and brake are controlled by circuitry that monitors the orientation of the table, the indexer input and the condition of the clutch. The motor is started in response to a signal generated as part of the machine cycle of operation. Once the table has completed its index, the control circuitry produces a signal to activate the operating station mechanisms. When the indexer input has completed a full revolution, the motor is stopped and the brake is activated by the control circuitry. The control circuitry is reset to its initial condition when the operating station functions have been completed, thereby putting the control circuitry in a condition to effect another table index. If the control circuitry receives a signal indicating the clutch is in a disengaged condition, the motor is disconnected from both its drive and the regenerative brake allowing it to coast to a stop.

BRIEF DESCRIPTION OF THE DRAWINGS

FIG. 1 illustrates elements of the complete indexing drive system as used in an integrated machine.

FIG. 2 illustrates the rotational relationship of an indexing mechanism used in the embodiment of the invention of FIG. 1.

FIG. 4a is a schematic diagram of the minimum logic elements needed to control the drive system of FIG. 1, shown electrically inactive.

FIG. 4b is a schematic diagram of the control circuitry employed with a machine, shown electrically inactive.

FIG. 4c is a schematic diagram showing in an electrically inactive state the connections required to control a direct current electric motor and dynamic brake by means of the circuitry of FIG. 4b FIG. 4d is a schematic diagram showing in an electrically inactive state the connections required to control an alternating current motor and electromechanical brake by means of the circuitry of FIG. 4b.

DESCRIPTION OF THE PREFERRED EMBODIMENT

Figure 3:
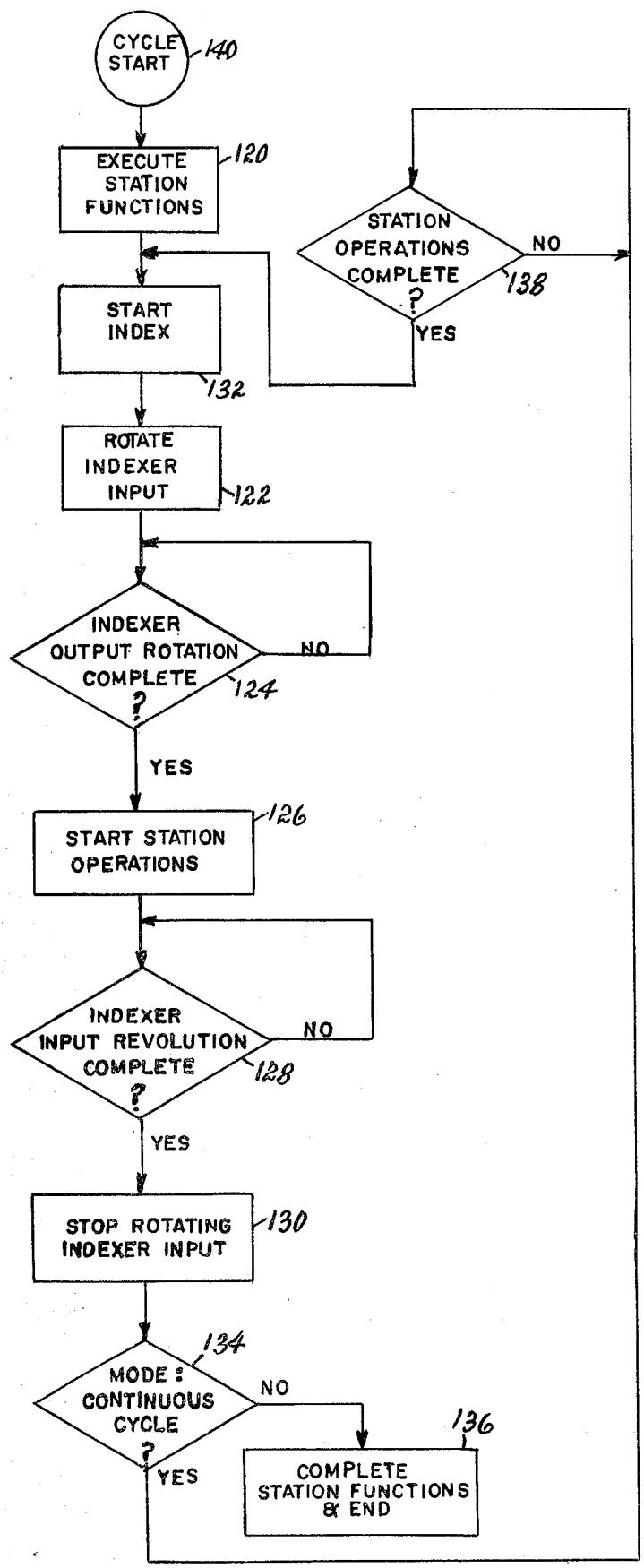
FIG. 3 is a flow chart illustrating the sequence of steps necessary to execute a machine cycle of operation incorporating the invention.

FIG. 1 illustrates the combination of devices in which the invention is embodied and which are used in a four station integrated machine. Details of the particular components shown in FIG. 1, should not be construed as limitations of the claimed invention.

In order to transport products to and from the operating stations of an integrated machine in accordance with the disclosed invention requires means, such as motor 44 for rotating the input of indexer 40 and means, such as control circuitry 88, for activating the operating station mechanisms and for controlling energization of motor 44. The control means must respond to index initiating signals and sensed orientations of the input and output members of indexer 40. Sensing means for monitoring the output member orientation include switch trip dogs 66 and limit switch 68. Sensing means for monitoring the input member orientation include switch trip dog 86 and proximity switch 84. Clutch 38 protects the indexer in the event that the rotary table is mechanically inhibited as by an accident from completing an index at a time when the indexer input is being rotated. Speed reducer 42 multiplies the output torque of motor 44 thereby reducing the overall power input requirements of the motor and consequently reducing the cost of the associated motor drive circuitry.

In the four station machine configuration, the required 90 degree indexes must be sufficiently accurate to insure noninterfering alignment of the product carrier centers with various insertable cores. Upon completion of an index of the rotary table 32, it must be held in place to prevent displacement of the products from alignment with the operating station mechanisms as might be occasioned by the forces produced by these mechanisms acting on the products. The design of indexer 40 is such that the magnitude of output shaft rotations resulting from recurrent rotations of the input member repeat within a few hundredths of a degree without resort to positive stops or their like and, once the output shaft rotation is complete, it is effectively locked in position until another index is initiated. The combination of the speed reducer 42, indexer 40 and clutch 38 are commercially available as a unit from Commercial Cam Div. of Emerson Electric Co. of Chicago, Ill.

With reference to FIG. 1, the operating station products are carried by the rotary table 32 shown with four switch trip dogs 66 reflecting the four operating stations of the integrated machine. Reasonably, any number of machine operating stations greater than one could be accomodated by the disclosed drive system subject to the restriction that the stations be disposed equi-angularly about the axis of the rotary table 32. The switch trip dogs 66 are used to actuate the position sensing limit switch 68 and thereby produce a signal passed over wires 76 to control circuitry 88 indicating registration of the operating station products with the operating stations. The control circuitry 88 activates the operating station mechanisms in response to this signal.

Rotary table 32 is rigidly affixed to the splined shaft 36 which is in turn rigidly attached to the output member of clutch 38. The input member of clutch 38 is affixed to the output shaft 62 of the indexer 40. The input member and output member of clutch 38 are disengaged when the relative torque between the two exceeds a predetermined amount, thereby protecting the indexer 40 from torque overloads. In the event the clutch disengages, disc 58 is displaced along the axis of output shaft 62 towards the indexer causing actuation of limit switch 72 by displacement of probe 70. A signal is then passed over wires 74 to control circuitry 88 indicating the disengaged condition of clutch 38.

The input member of indexer 40 is rigidly attached to the output shaft 60 of speed reducer 42. Therefore, each rotation of the output shaft 60 of speed reducer 42 corresponds to a rotation of the input member of indexer 40. Thus, the relative orientation of the input member of indexer 40 is reflected in the orientation of the output shaft 60 of speed reducer 42. The orientation of output shaft 60 is monitored by use of switch trip dog 86 and proximity switch 84. When the switch trip dog is aligned as shown in FIG. 1 with the position sensing proximity switch 84, a signal is produced and carried over wires 78 to the control circuitry 88. The switch trip dog 86 is located on shaft 60 so that it will be aligned with proximity switch 84 when the orientation of the input member of indexer 40 is such that further rotation thereof, in the direction for causing output shaft indexes, will result in immediate commencement of rotation of the indexer output shaft. The proximity switch 84 has the advantage that actuation thereof will not be subject to inaccuracies introduced by mechanical wear as would be the case if a contact driven limit switch were used in its place. The input shaft 90 of speed reducer 42 is rotatably coupled to the output shaft 92 of direct current motor 44 by belt 82. The motor 44 is driven through its terminals 94 by power supplied over wires 80 from control circuitry 88. Additionally, the control circuitry 88 connects the dynamic brake across terminals 94 by means of wires 80.

To complete a cycle of indexer 40, the control circuitry causes motor 44 to run until signals from switches 68 and 84 are returned to the control circuitry indicating the desired alignment of the rotary table and the indexer input member. Once both signals are active, the control circuitry disconnects the source of power to the motor 44 and connects the dynamic brake across motor terminals 94. The effect of the brake is to minimize the period of deceleration of rotation of output shaft 92. The control circuitry 88 responds to an input from switch 72 indicating that clutch 34 is disengaged by disconnecting terminals 94 of motor 40 from the power source and leaving motor 44 disconnected from the dynamic brake. This permits the motor to coast to a stop to avoid potential damage to the indexer 40 which might occur if rotation of the input were suddenly stopped against the high inertial loads developed within indexer 40.

FIG. 2 illustrates the rotational relationship of input shaft 100 and output shaft 62 of the indexer 40. Rotation of input shaft 100 in the counterclockwise direction as indicated by arrow 106 through an angle $\beta$ of 360 degrees results in rotation of output shaft 62 in a clockwise direction as indicated by arrows 108 through an angle $\alpha$ of 90 degrees. During an index the relative orientations of input shaft 100 and output shaft 62 are of no consequence, and the output shaft rotation will be completed before completion of a full revolution of the input shaft 100. However, once the output shaft 62 has completed rotation through its angle $\alpha$, the input shaft must be rotated to a point 104 completing rotation through its angle $\beta$ in order to be in a condition to effect the next rotation of output shaft 62. It is of no consequence where in the rotation of input shaft 100 point 104 lies, however, it is necessary that the points 102 marking start and stop points of output shaft rotation be aligned with the operating stations of the machine.

FIG. 3 is a flow chart of the part of a machine cycle of operation concerned with transporting products to and from the operating stations using the indexer 40 and illustrates a method for control thereof.

Briefly, the method begins with production of an index initiating signal, block 132, in response to a machine condition requiring an index. The indexer input is rotated, block 122, in response to this signal and the output shaft orientation is monitored to detect completion of its rotation, decision block 124. Operation of the operating station functions is initiated in response to detecting the aforementioned output shaft orientation, block 126. The orientation of the input shaft is monitored to detect completion of a full revolution thereof, decision block 128, and rotation of the indexer input shaft is stopped when that output shaft orientation is detected, block 130. Continuous operation of the machine is then carried out by repeating these steps provided that the machine is in a continuous cycle mode, decision blocks 134 and 138.

Assuming there are no products in the machine at the time operation is initiated, actuation of a cycle start switch initiates execution of the machine cycle at circle 140. As indicated by block 120 the operating station functions will be executed as the beginning of the machine cycle. In the case where the machine is initially devoid of products, the effect of the execution of the station functions is simply the production of a first subproduct or a first set of subproducts at a first one of the operating stations. Therefore, once the first station function is complete, the machine cycle can continue only by initiating an index to transport these subproducts to a second one of the operating stations. The machine cycle initiates the index start indicated by block 132 which results in rotation of the indexer input member as indicated in block 122 by causing the control circuitry 88 to disconnect the brake and apply power to the motor 44. The next step of the machine cycle, operation of the machine functions at the operating stations, can only begin upon completion of the rotation of the indexer output shaft 62, and completion of this rotation is detected by limit switch 68 when actuated by one of switch trip dogs 66.

As indicated by the return path on NO side of decision block 124, the machine cycle does not continue until the indexer output rotation is complete. Once the index of rotary table 32 is complete, control circuitry 88 produces a signal to activate the mechanisms at the operating stations as indicated by block 126. At this point, the first subproduct(s) fabricated after the cycle was started have been transported to the second operating station and the second product processing step is taking place. Simultaneously, at the first operating station a second set of subproduct(s) is being produced. Concurrently, with the execution of operating station functions the rotation of the input shaft 100 of the indexer is continued with the object of completing a full revolution of that shaft. Since the next step in the execution of a machine cycle would require that the products be transported to the next stations, the machine cycle cannot be continued until the indexer is in a condition such that further rotation of the input shaft will result in rotation of the output shaft. This condition is detected by proximity switch 84 when actuated by switch trip dog 86 and is indicated by the YES path of decision block 128 from which the machine cycle of operation continues to block 130 where the rotation of the indexer input is stopped. To stop the rotation of the indexer input shaft 100, the power source is disconnected from the motor 44 and the dynamic brake is activated.

With the index complete the final step in this part of the machine cycle is a determination of whether or not the machine is in a mode of operation requiring continuous cycling, this test being indicated by decision block 134. If the determination is negative, as indicated by the NO line from block 134, then the machine cycle ends when the execution of the station functions are completed as indicated at block 136. If, on the other hand, the machine mode is one requiring continuation of the machine cycle, then progress of the machine cycle depends upon completion of execution of the operating station functions as indicated by decision block 138. Once these functions have been completed, as indicated by the YES line from decision block 138, the machine cycle continues by requesting another index as indicated by the return path to the start index block 132.

In order to complete the machine cycle of product fabrication, two more indexes of rotary table 32 are required. The first of these advances the subproduct(s) at the second operating station to the third operating station where the subproduct(s) are processed into finished products. As before, all operating station functions are executed simultaneously, and, provided the machine remains in a continuous cycle mode, the index required for completion of the machine cycle will follow execution of these functions. The final index advances the product(s) at the third operating station to a fourth station, where the product carrier(s) open to release the product(s) for ejection. All other operating station functions are activated as well and in this manner the machine produces subproducts and products continuously so long as its mode of operation is not changed.

FIGS. 4a and 4b illustrate the logical elements of the control circuitry 88 of FIG. 1. While the schematic diagrams of these Figs. are comprised of relay coils and contacts, characteristic of electromechanical relays, these particular details should not be construed as limiting the claimed invention. It is well within the ordinary skill of a machine control designer to accomplish these same logic functions using a variety of devices or systems. Besides the straight forward implementation of the control circuitry in the program of a programmable controller, the required logic functions could easily be duplicated using currently available integrated circuit technology including AND and OR functions together with simple storage devices.

With reference to FIG. 4a, the normally open switch contacts 68N are associated with limit switch 68 operated by the switch trip dogs 66 affixed to the rotary table 32. When contacts 68N are closed, the signal appearing on line 162 indicates that the rotary table is aligned for registration of the products with the machine operating stations. This signal is then used to energize control relay 168 which controls activation of the operating station mechanisms.

The normally closed switch contacts 84A and normally open switch contacts 84N are associated with proximity switch 84 actuated by switch trip dog 86. Switch contacts 84A are used to hold the motor drive control relay 172 energized while the indexer input shaft 100 is driven through a complete revolution by motor 44. Since the normal or inactive condition of the drive system leaves switch trip dog 86 in position to actuate proximity switch 84, the contacts 84A are open when the system is in its normal condition. To energize the motor control relay 172, thereby causing the motor to run, an alternative path is provided through the motor start contacts 174 and, therefore, the signal appearing on line 182 represents an OR function of the states of contacts 174 and 84A. The contacts 174 need only close momentarily so that the indexer input is advanced beyond the point where switch 84 is actuated. When contacts 84A close, the motor control relay 172 is held energized until proximity switch 84 is again actuated by switch trip dog 86. In order to enable the motor to run, it is necessary that the dynamic brake be disconnected from the motor terminals and this is accomplished by the brake control relay 180. Control relay 180 is energized by the AND function of contacts 84N and 178. At the time the start contacts 174 close, the start normally-closed contacts 178 will open assuring that the brake control relay 180 is deenergized. Keeping in mind that the start contacts 178 will be in the altered states only momentarily, the path for energization of the brake control relay 180 will be dependent on the state of contacts 84N because of closure of the normally-closed start contacts 178. When switch 84 is again actuated, contacts 84N will be closed and the brake will be activated.

FIG. 4b illustrates the details of control circuitry used to implement the index control portion of the machine cycle of operation shown in FIG. 3. The line numbers hereafter given in the description of FIG. 4b refer to the numbers to the left to the input common line 200. For purposes of this description, it is assumed that the normally-open contacts labeled START in lines 1, 5 and 21 are only momentarily closed at the initiation of the index.

Switch contacts SW68 are closed when one of the switch trip dogs 66 actuates position sensing switch 68. Switch contacts SW84 are closed when the switch trip dog 86 actuates proximity switch 84 and switch contacts SW72 are closed when the plate 58 actuates switch 72 through displacement of the probe 70.

In the normal or rest condition of the indexing system, switch contacts SW68 and SW84 will be closed, indicating that the rotary table 32 is aligned with the operating stations and the input shaft of indexer 36 is oriented such that rotation of the input shaft will result in immediate rotation of the indexer output shaft. Under these conditions, a momentary closure of the normally-opened contacts START in lines 1 and 5 corresponding to start index block 132 of the flow chart of FIG. 3 will energize control relays 1CR and 2CR. These relays are connected as resettable latches using the normally-opened contacts, 1CR, line 3 and 2CR, line 7, respectively, as the alternative or latching lines. Assuming that the normally-closed contacts 3CR in lines 3 and 7 are in the closed condition, immediately upon energization of 1CR and 2CR, an alternative path for energizing those control relays is provided through lines 3 and 7. As a result of these alternative paths the condition of the START contacts in lines 1 and 5 as well as the conditions of the switch contacts SW68 and SW84 in lines 1 and 5, respectively, are of no consequence since the alternative lines hold the coils energized and thus latched. Both of these control relays will remain energized until the normally-closed contacts 3CR in lines 3 and 7 are opened as a result of the energization of control relay 3CR in line 9. Latching control relay 1CR in its energized state is a means of providing a signal indicating that the index start signal was given at a point in time when the rotary table 32 was in its aligned position. Energizing and latching control relay 2CR is a means of producing a signal indicating that the index start signal was given at a time when the indexer was in its rest condition.

At the time the index start signal was given, the normally-opened start contacts in line 21 resulted in the energization of the motor control relay 1M which is also connected as a resettable latch, the resets being provided by the normally-closed contacts of 5CR and 6CR. With the motor control relay 1M energized, the dynamic brake will be deactivated and the motor 44 will be supplied with power. With the motor running, both switches 84 and 68 will cease to be actuated as the rotary table 32 begins to index and the output shaft 60 of speed reducer 42 begins to rotate. The result of this is that the normally closed contacts SW68 and SW84 in line 9 will now close and with the normally-opened contacts 1CR and 2CR in line 9 being closed as a result of the control relays 1CR and 2CR being latched, control relay 3CR in line 9 will be energized and resettably latched through the alternate path shown in line 11. Both 1CR and 2CR latches are reset at this time. The signal on line 9 which initially energizes control relay 3CR indicates that the index initiated by momentary closure of the START contacts is in progress.

With reference to the machine cycle of operation illustrated in FIG. 3, once the index has started, the next step in the cycle of operation is to start the station operations when the rotary table index is complete. The determination that the rotary table index is complete is illustrated at decision block 124. This decision block corresponds to the logic incorporated in line 13 where the normally-opened contact 3CR which is closed, indicating that an index is in progress, transfers a signal to the switch contacts SW68 which will be closed upon completion of the rotary table index. When switch contacts SW68 close, the control relay 4CR is energized and the contacts of this relay can be used to initiate the execution of functions at the machine operating stations.

Referring again to the flow chart of FIG. 3 having initiated the functions at the machine operating stations as indicated by block 126, the next step in the machine cycle of operation is the determination of completion of the indexer input rotation indicated by decision block 128. This determination corresponds to the logic illustrated in line 15 of FIG. 4b. Here the normally opened contacts 3CR which are closed while the index is in progress transmit the signal to the normally-opened switch contacts SW68 which will close upon completion of the rotary table index and consequently pass the signal to the normally-opened switch contacts SW84 which when closed will result in energization of control relay 5CR. The energization of control relay 5CR will result in the normally-closed contacts 5CR in line 23 opening, thus, deenergizing the motor control relay 1M in line 21. It should be noted that the control relay 5CR is also configured as a resettably latched relay through the alternate path shown in line 17.

Referring again to the flow chart of the machine cycle of operation of FIG. 3, it is seen that when the index is complete and the rotation of the indexer input is stopped, corresponding to block 130, the cycle will end or continue only upon completion of the execution of functions at the machine operating stations. In FIG. 4b, line 17, the normally-closed contact FUNCT. COMP. will open upon completion of execution of the functions at the machine operating stations and consequently deenergize control relay 5CR. At the time of completion of the index when 5CR was energized, the normally-closed contacts 5CR in line 11 opened resulting in deenergization of control relay 3CR on line 5. Deenergization of control relay 3CR results in the closing of the normally-closed contacts 3CR in lines 3 and 7. All circuits are therefore returned to their original conditions ready to begin another index with the momentary closure of the normally-opened START contacts in lines 1, 5 and 21.

FIGS. 4c and 4d illustrate alternative motors and brakes that could be readily controlled by the circuitry shown in FIG. 4b.

FIG. 4c illustrates the application of a direct current motor 44D used as motor 44 of FIG. 1, an electronic drive package 232 and a dynamic brake 236. The alternating current source 228 provides power to the drive package 232 over lines 230. The drive package 232 uses current switching devices to transmit portions of the alternating current wave provided by the alternating current source 228 to the motor 44D in such fashion as to control its speed and direction of rotation. Referring to FIG. 4b, when the motor control relay 1M is energized, the normally-opened contacts 1M in FIG. 4c will be closed and a circuit is provided through the motor terminals for current being supplied by the drive package 232. At the same time, the normally-closed contacts 1M of FIG. 4c are opened and the dynamic brake 236 is disconnected from the motor terminals. At the moment of deenergization of the motor control relay 1M, the normally-opened contacts 1M of FIG. 4c will open, the normally-closed contacts 1M will close and an alternate current path is provided through the motor terminals by the dynamic brake 236. The current that flows in this path arises from the electromotive force being generated by the motor as the rotor continues rotation because of momentum. The magnetic field produced by this current produces forces opposing rotor momentum thus increasing the rate of deceleration.

The drive package 232 and dynamic brake 236 are commercially available and selected in accordance with the specifications of the motor 44D which has been chosen for the combination of velocity and torque output necessary to drive the machine indexing assembly. Referring again to FIG. 4b, line 19, if the normally-opened switch contacts SW72 are closed, control relay 6CR will be energized, causing the normally-closed contacts 6CR of FIG. 4c to open thereby disconnecting the motor 44D from both the drive electronics package 232 and the dynamic brake 236. In this manner, the motor is permitted to coast to a stop in the event that the clutch 34 is in a disengaged condition.

FIG. 4d illustrates the application of an alternating current motor 44A, used as motor 44 of FIG. 1, with an electromechanical brake 226, arranged to act on the motor shaft. In this case, the alternating current source 220 is connected over wires 222 through the normally-opened contacts 1M. Referring again to FIG. 4b, if motor control relay 1M of line 21 is energized, then the normally-opened contacts 1M of FIG. 4d will be closed and the alternating current motor 44A will be connected to its power source of alternating current 200. Simultaneously, the electromechanical brake 226 will be disconnected from the alternating current source 220 as a result of the normally-closed contacts 1M being in the opened condition. At the time of deenergization of motor control relay 1M shown in line 21 of FIG. 4b, the normally-opened contacts 1M of FIG. 4d will open, the normally-closed contacts 1M of FIG. 4d will close, effecting a disconnection of the motor 44A from the alternating current source 220 and simultaneously energizing the electromechanical brake 226.

In the event that the clutch 38 is disengaged, the normally-opened switch contacts SW72 of line 19 of FIG. 4b will close energizing the control relay 6CR causing the normally-closed contact 6CR in line 23 to open deenergizing the motor control relay 1M. The resultant condition of the contacts of FIG. 4d are as follows. Normally-opened contacts 1M will be opened, normally-closed contacts 1M will be closed and normally-closed contacts 6CR will be opened. Thus, with the clutch disengaged, the alternating current motor 44A is disconnected from its alternating current source 220 and the electromechanical brake 226 is simultaneously disconnected from its alternating current source 220 so that the alternating current motor 44A is allowed to coast to a stop.

What is claimed is:

1. An apparatus for rotatably transporting workpieces in an indexing manner to and from a plurality of operating stations making up an integrated machine in response to index initiating signals produced as part of a machine cycle of operation, the apparatus comprising:
   (a) a rotary driving means;
   (b) a workpiece conveying means for carrying a plurality of workpieces;
   (c) an indexing mechanism including an input shaft and an output shaft and wherein continuous rotation of the input shaft is converted to intermittent rotation of the output shaft through predetermined segments of a full revolution, each being completed before completion of one revolution of the input shaft, and the input shaft of which is coupled to the rotary driving means and the output shaft of which is coupled to the workpiece conveying means;
   (d) first sensing means for detecting an alignment of the workpiece conveying means effecting registration of the workpieces with the operating stations;
   (e) means coupled to the first sensing means for producing a first signal indicating the alignment of the workpiece conveying means with the operating stations;
   (f) means responsive to the first signal for activating the operating stations;
   (g) second sensing means for detecting orientation of the input shaft of the indexing mechanism at a position, departure from which in a predetermined direction effects immediate output shaft rotation;
   (h) means coupled to the second sensing means for producing a second signal indicating alignment of the input shaft of the indexing mechanism at the orientation for immediately effecting output shaft rotation;
   (i) means responsive to the second signal and coupled to the rotary driving means for stopping rotation thereof; and
   (j) means responsive to the index intitiating signals for overriding the second signal and thereby causing rotation of the rotary driving means.

2. The apparatus of claim 1 further comprising:
   (a) clutch means, having an input member coupled to the indexing mechanism and an output member coupled to the workpiece conveying means, for disengaging the indexing mechanism from the workpiece conveying means in response to the torque between the input member and the output member exceeding a predetermined amount;
   (b) third sensing means for detecting the disengaged condition of the clutch means;
   (c) a means coupled to the third sensing means for producing an overload signal indicating a torque overload condition of the clutch means; and
   (d) means responsive to the overload signal for interrupting the supply of motive force to the rotary driving means.

3. The apparatus of claim 2 wherein the rotary driving means comprises:
   (a) a direct current electric motor having an output shaft;
   (b) means rotatably coupled to the motor output shaft and the indexing mechanism input shaft for producing rotation thereof at a velocity other than that of the motor.

4. The apparatus of claim 3 wherein the means for stopping rotation of the rotary driving means includes brake means for causing an electromotive force generated by the direct current electric motor to oppose momentum of the output shaft thereof.

5. The apparatus of claim 2 wherein the rotary driving means comprises
   (a) an alternating current electric motor having an output shaft; and
   (b) means rotatably coupled to the motor output shaft and indexing mechanism input shaft for producing rotation thereof at a velocity other than that of the motor.

6. The apparatus of claim 5 wherein the means for stopping rotation of the rotary driving means includes an electromechanical brake.

7. The apparatus of claim 2 further comprising:
   (a) first latching means for resettably latching the first signal and thereby indicating the presence of the first signal during the absence thereof until reset of the latching means;

(b) second latching means for resettably latching the second signal;

(c) third latching means responsive to the absence of the first and second signals and to the presence of a latched condition of the first and second latching means for producing an in process signal indicating that rotation of the indexing mechanism input shaft has resulted in the start of rotation of the output shaft;

(d) means for resetting the first and second latching means in response to the in process signal;

(e) fourth latching means responsive to the presence of the second and in process signals for producing a function start signal indicating that machine functions at the machine operating stations may be initiated;

(f) fifth latching means responsive to the presence of the first, second and in process signals for producing a control signal;

(g) means responsive to the control signal and coupled to the rotary driving means for stopping rotation thereof; and (h) means responsive to the control signal for resetting the third latching means.

8. In an integrated machine having a plurality of operating stations at which functions in a machine cycle for fabrication of products are carried out, and equipment for rotatably transporting the products to and from the operating stations in an indexing manner that has an indexing mechanism having an input shaft and an output shaft and wherein continuous rotation of the input shaft is converted into intermittent rotation of the output shaft through predetermined segments of a full revolution of substantially equal magnitude, each being completed before a completion of one revolution of the input shaft, the method of transporting the operating station products to and from the operating stations comprising the steps of:

(a) producing an index initiating signal in response to a condition of the machine created during execution of the machine cycle of operation calling for an index;

(b) rotating the input shaft of the indexing mechanism in response to the index initiating signal;

(c) sensing an orientation of the indexing mechanism output shaft corresponding to completion of rotation thereof through a first predetermined segment;

(d) initiating execution of the operating station functions in response to detecting said output shaft orientation;

(e) sensing an orientation of the indexing mechanism input shaft corresponding to completion of a full revolution thereof;

(f) stopping rotation of the indexing mechanism input shaft in response to detecting said orientation thereof; and (g) iterating steps (a) through (f) as required for continuous execution of the machine cycle of operation.

9. The method of claim 8 further comprising the step of initiating execution of at least one but not all operating station functions in response to detecting said output shaft orientation.

10. The method of claim 8 wherein a plurality of products are produced and processed by each of said operating stations.

11. The method of claim 8 wherein one product is produced and processed by each of said operating stations.

* * * * *